US007500152B2

(12) United States Patent
Moyer et al.

(10) Patent No.: US 7,500,152 B2
(45) Date of Patent: Mar. 3, 2009

(54) APPARATUS AND METHOD FOR TIME ORDERING EVENTS IN A SYSTEM HAVING MULTIPLE TIME DOMAINS

(75) Inventors: William C. Moyer, Dripping Springs, TX (US); Richard G. Collins, Austin, TX (US); Michael D. Fitzsimmons, Austin, TX (US); Jason T. Nearing, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 599 days.

(21) Appl. No.: 10/728,398

(22) Filed: Dec. 5, 2003

(65) Prior Publication Data
US 2005/0138484 A1    Jun. 23, 2005

(51) Int. Cl.
*G06F 11/00* (2006.01)
(52) U.S. Cl. ........................................................ 714/45
(58) Field of Classification Search .................. 714/15, 714/20, 30, 47, 48, 45
See application file for complete search history.

(56) References Cited

U.S. PATENT DOCUMENTS

| | | | | |
|---|---|---|---|---|
| 4,816,989 A * | 3/1989 | Finn et al. ..................... | 709/248 |
| 5,317,564 A | 5/1994 | Nugent | |
| 5,642,478 A * | 6/1997 | Chen et al. ..................... | 714/45 |
| 5,848,264 A | 12/1998 | Baird | |
| 6,125,368 A * | 9/2000 | Bridge et al. .................. | 707/201 |
| 6,145,122 A | 11/2000 | Miller | |
| 6,170,067 B1 * | 1/2001 | Liu et al. ....................... | 714/48 |
| 6,243,838 B1 * | 6/2001 | Liu et al. ....................... | 714/57 |
| 6,269,412 B1 * | 7/2001 | Liu et al. ....................... | 710/19 |
| 6,282,701 B1 * | 8/2001 | Wygodny et al. ........... | 717/125 |
| 6,327,630 B1 | 12/2001 | Carroll et al. | |
| 6,477,617 B1 | 11/2002 | Golding | |
| 6,487,683 B1 * | 11/2002 | Edwards ....................... | 714/38 |
| 6,502,210 B1 | 12/2002 | Edwards | |
| 6,557,119 B1 | 4/2003 | Edwards | |
| 6,895,009 B1 * | 5/2005 | Stallkamp .................... | 370/394 |
| 6,944,187 B1 * | 9/2005 | Driediger et al. ............ | 370/503 |
| 6,966,015 B2 * | 11/2005 | Steinberg et al. ............. | 714/47 |

(Continued)

OTHER PUBLICATIONS

"The Nexus 5001 Forum™ Standard for Global Embedded Processor Debug Interface," Dec. 9, 1999, pp. 1-150, IEEE Industry Standards and Technology Organization (IEEE-ISTO), Piscataway, USA.

*Primary Examiner*—Robert Beausoliel
*Assistant Examiner*—Elmira Mehrmanesh
(74) *Attorney, Agent, or Firm*—Susan C. Hill; Robert L. King; Ranjeev Singh

(57) ABSTRACT

A system and method time orders events that occur in various portions of the system (10) where different time domains (12, 22, 32) exist. Timestamping circuitry (e.g. 40) is provided in each of a plurality of functional circuits or modules (14, 24, 34). The timestamping circuitry provides a message that indicates a point in time when a predetermined event occurs. An interface module (70) is coupled to each of the plurality of functional circuits (14, 24, 34). The interface module (70) provides control information to the plurality of functional circuits (14, 24, 34) to indicate at least one operating condition that triggers the predetermined event, and to optionally specify a message format. The interface module (70) provides a timestamping message from one, several or all time domains at a common interface port (90).

21 Claims, 3 Drawing Sheets

U.S. PATENT DOCUMENTS

| | | | |
|---|---|---|---|
| 7,003,730 B2 * | 2/2006 | Dettinger et al. | 715/764 |
| 7,031,869 B2 * | 4/2006 | Litt et al. | 702/125 |
| 7,051,237 B2 * | 5/2006 | Mayer | 714/27 |
| 7,058,855 B2 * | 6/2006 | Rohfleisch et al. | 714/28 |
| 7,249,288 B2 * | 7/2007 | Peled et al. | 714/47 |
| 2002/0169863 A1 | 11/2002 | Beckwith et al. | |
| 2002/0188831 A1 | 12/2002 | Jackson | |
| 2003/0014695 A1 * | 1/2003 | Mayer | 714/39 |
| 2004/0148373 A1 | 7/2004 | Childress et al. | |
| 2004/0250164 A1 * | 12/2004 | Ahmad et al. | 714/30 |
| 2005/0078711 A1 * | 4/2005 | Stallkamp | 370/503 |
| 2006/0069953 A1 * | 3/2006 | Lippett et al. | 714/25 |
| 2007/0180313 A1 * | 8/2007 | Stokes et al. | 714/13 |

\* cited by examiner

APPARATUS AND METHOD FOR TIME ORDERING EVENTS IN A SYSTEM HAVING MULTIPLE TIME DOMAINS

FIELD OF THE INVENTION

The present invention relates generally to time ordering events, and more particularly to time ordering events in a system having multiple time domains.

RELATED ART

Timestamping is a useful technique that may be used in a system, such as, for example, in debugging a system, to indicate when a desired event occurred in the system. Some systems, including systems which are integrated on a single integrated circuit, include a plurality of time domains. For some applications, there may be no easy method for directly correlating time domains with each other and with time references external to the system.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as, for example, data, addresses, control, or status.

Figure 1:
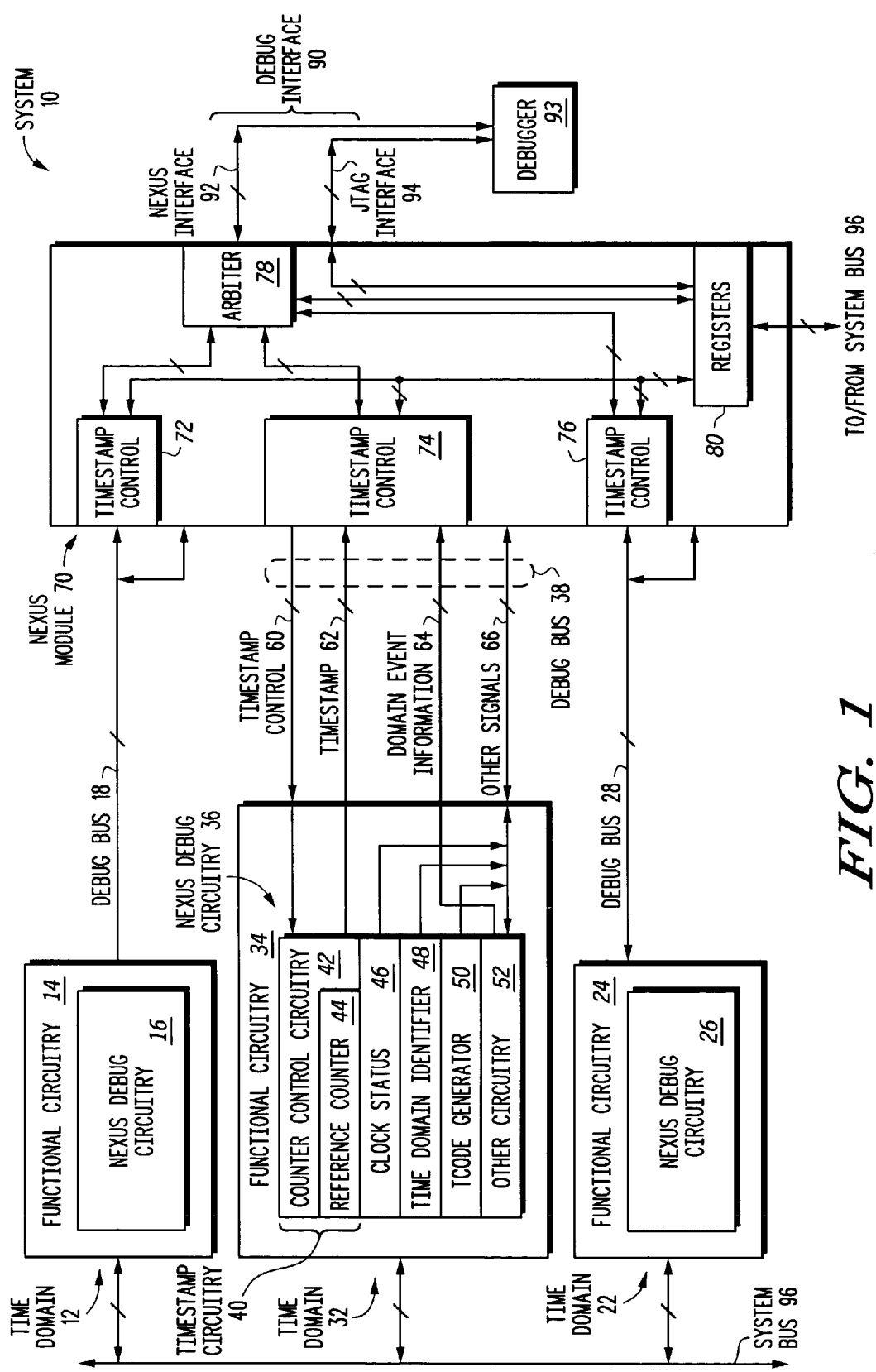
FIG. 1 illustrates, in block diagram form, a system in accordance with one embodiment of the present invention.

Illustrated in FIG. 1 is a data processing system 10 generally having a time domain 12, a time domain 32 and a time domain 22. The time domain 12 includes a module that represents functional circuitry 14. Contained within functional circuitry 14 is NEXUS debug circuitry 16 where "NEXUS"™ refers to the publicly available IEEE ISTO 5001 standard for debugging and/or emulating, and/or testing integrated circuits. Similarly, time domain 32 has functional circuitry 34 and NEXUS debug circuitry 36. Time domain 22 has functional circuitry 24 and NEXUS debug circuitry 26. One possible embodiment of the NEXUS debug circuitry 36 is illustrated in detail. It should be apparent that NEXUS debug circuitry 16 and NEXUS debug circuitry 26 may be implemented in the same manner or with variations. The functional circuitry 14 is coupled to a NEXUS module 70 by a debug bus 18. NEXUS debug circuitry 36 is coupled to NEXUS module 70 by a debug bus 38, and NEXUS debug circuitry 26 is coupled to NEXUS module 70 by debug bus 28.

The NEXUS debug circuitry 36 includes timestamp circuitry 40 having counter control circuitry 42 and a reference counter 44. NEXUS debug circuitry 36 also includes a clock status circuit 46, a time domain identifier 48, a TCODE generator 50, and other circuitry 52. The debug bus 38 is formed by a timestamp control bus 60 coupled from NEXUS module 70 to the counter control circuitry 42, timestamp signals 62 coupled from the counter control circuitry 42 to the NEXUS module 70, a domain event information bus 64 coupled from the other circuitry 52 to NEXUS module 70, and a bidirectional bus for other signals 66. In one embodiment, the other signals 66 couple the clock status 46, time domain identifier 48, TCODE generator 50, and other circuitry 52 to the NEXUS module 70. The other signals 66 are bidirectionally coupled between the other circuitry 52 and the NEXUS module 70.

The NEXUS module 70 generally includes a timestamp control circuit associated with each time domain. In the illustrated form, timestamp control 72 is coupled to debug bus 18. Timestamp control 74 is coupled to each bus that forms debug bus 38, except the other signals 66 bus that couples to other control circuitry (not shown) within NEXUS module 70 that is not relevant to the debug functionality described herein. Timestamp control 76 is coupled to debug bus 28. An arbiter 78 is bidirectionally coupled to each of timestamp control 72, timestamp control 74 and timestamp control 76, and to a plurality of registers 80. Each of timestamp control 72, 74, and 76 is bidirectionally coupled to the plurality of registers 80. A bidirectional NEXUS interface port 92 is coupled to arbiter 78. A bidirectional JTAG interface 94 is coupled to the plurality of registers 80. The plurality of registers 80 is bidirectionally coupled to and from a system bus 96. System bus 96 is also bidirectionally coupled to each of time domain 12, time domain 32 and time domain 22.

Note that a common standard used for integrated circuit debug, emulation, and/or testing purposes is the well known JTAG (Joint Test Action Group) IEEE (Institute of Electrical and Electronic Engineers) 1194.1 test access port and boundary scan architecture. Although debug interface 90 has been illustrated as having a JTAG interface, alternate embodiments of system 10 may use any desired interface. For example, in addition to the standard JTAG interface, there are a wide variety of other debug, emulation, and/or test interfaces used for integrated circuits. Similarly, alternate embodiments may use a wide variety of other debug, emulation, and/or test interfaces in place of the NEXUS interface 92.

In one embodiment of system 10, debugger 93 may optionally be coupled to debug interface 90 during at least a portion of the debugging process for system 10. Alternate embodiments may not require an external debugger 93 to perform debugging functionality. In one embodiment, system 10 may be implemented on a single integrated circuit and debugger 93 may be implemented external to that integrated circuit. For some embodiments, debugger 93 is not coupled to debug interface 90 during normal operation of system 10. Debugger 93 may be implemented using any combination of hardware and software.

Operation of the system 10 of FIG. 1 will now be described. In one embodiment that is illustrated, a plurality of time domains 12, 22, 32 may provide time-related information regarding when an event within the time domain occurred. In one embodiment, time domains are local regions in system 10 with a common power and/or clock domain. Elements within a time domain remain synchronized by design, however time domains are not typically required to remain fully synchronized with other time domains. In one embodiment, each one of time domains 12, 22, 32 includes functional circuitry 14, 24, 34, respectively, which functions using an independent clock or derivatives of a same clock. Functional circuitry 14, 24, and 34 may perform any desired function. Note that each time domain 12, 22, 32 also includes NEXUS debug circuitry 16, 26, and 36, respectively. Alternate embodiments may use other circuitry 16, 26, 36 which is not NEXUS debug circuitry.

Note that although system 10 has been illustrated to have three time domains, namely times domain 12, 22, and 32, alternate embodiments may have any number of time domains. One example of a system 10 which may have a plurality of time domains 12, 22, 32 is an integrated circuit in which time domain 12 includes a processor which operates at a very high clock rate or frequency, time domain 22 includes circuitry which operates at a lower clock rate or frequency in order to conserve power, and time domain 32 which includes peripheral modules that are designed to operate at a third clock rate or frequency. Alternate embodiments may delineate the boundaries of time domains using any desired criteria.

In some embodiments, circuitry in different time domains operates independently and with no relative constraints between the clock frequencies or duty cycles of other time domains. In addition, the clocking of circuitry within a time domain may be suspended or undergo a change in frequency as the state of the overall system 10 changes, and this may occur independently of the clocking of any other time domain. Time domains may function and be defined differently in alternate embodiments. In one embodiment, independent clock rates include clock rates that are separate and distinct in one or more of a variety of ways, such as, for example, clocks that are sub-multiples of a common clock, clocks that are separately generated and are not intentionally related, and a common clock source that is temporarily stopped to a particular time domain.

In one embodiment, independent clock rates are clocks rates that are separately controllable in some manner, thus are not guaranteed to have a specific relationship, and thus may be considered to be independent at least under certain conditions. Note that it is possible for independent clock rates to be related to each other for a subset of possible conditions. Although the timestamp messaging functionality described herein is very useful when used with a plurality of time domains (e.g. 12, 22, 32) having independent clock rates, alternate embodiments may not require that any, some, or all of the plurality of time domains have independent clock rates.

For some embodiments, in order to properly reconstruct the temporal ordering of events within system 10, the relationships between reference counters (e.g. 44) within individual time domains (e.g. 12, 22, 32) must be determined. Determining these relationships as the individual time domains transition through low power states, clock frequency altering events, and other factors affecting the relative rate at which individual reference counters are updated is very helpful in determining the relationship of other timestamped debug events occurring within the individual time domains of system 10. The timestamp messaging functionality described herein provides the necessary information for determining the relationship between the distributed reference counters used for applying timestamp information to other debug message types as are generated by NEXUS debug circuitry 16, 36, and 26. These other debug message types are well known in the NEXUS standard, and include messages such as Program Trace, Data Trace, and Watchpoint messaging. In one embodiment, each of these messages generated by a particular time domain may be augmented with a timestamp value related to the state of the reference counter within the particular time domain. For proper trace reconstruction of the temporal ordering of events generated across multiple time domains, the reference counter values provided within a particular debug message must be correlated to each other. The timestamp messaging described herein provides this overall coordination capability by providing a way to determine the relationships of the individual reference counters within system 10.

Upon the occurrence of a particular event in one or more of time domains 12, 22, and 32, the values of one or more reference counters (e.g. 44) may be captured and transmitted via a timestamp message to debugging circuitry 93 external to debug interface 90. By providing these values, the relationships of the various distributed reference counters (e.g. 44) may be maintained, and thus proper temporal ordering of other debug message types which have been annotated with a timestamp may be performed. Since for some embodiments the reference counters (e.g. 44) operate independently of one another with no fixed relationship, the rate at which one or more reference counters change state is independent of all other of the reference counters. Reference counters (e.g. 44) may be temporarily halted while a particular time domain 12, 22, 32 enters a low power state, or may change to be incremented at a faster or slower rate as the dynamics of the particular time domain change. By messaging out information about the value and clock status of a reference counter (e.g. 44) within a particular time domain (e.g. 32), it is possible to maintain an ordering of counter values across multiple time domains 12, 22, 32.

In one embodiment, system 10 performs this "timestamp messaging" function in such a manner to facilitate ordering of events in system 10 which are timestamped by multiple independent reference counters (e.g. 44) operating at dynamically varying rates and to accomplish synchronization of the distributed sources' values by a tool (e.g. debugger 93) external to debug interface 90. Timestamp messaging is a new source of debug information which allows for proper temporal ordering of events in a distributed system with multiple time-varying clock domains. Timestamp messages may use either absolute or relative timing information. In some embodiments, relative timing information allows for shorter message length and message bandwidth reduction. Master Timestamp Sync Messages may also be used on a periodic basis to capture the values of some or all of the time domain reference counters (e.g. 44). This allows for a debug tool (e.g. debugger 93) to synchronize the time domain 12, 22, 32 relationships, to allow for accurate reconstruction of the actual sequence of system 10 events given individual time domain timestamped debug messages.

In one embodiment, a time domain Timestamp Sync Message may be messaged via debug interface 90 (provided Timestamp Messaging is enabled) for the following time domain events:

Initial Target Domain Timestamp Sync Message after exit from system reset or whenever Target Domain Timestamp Messaging is enabled Upon a change in reference clock Upon entering into a Low Power state Upon returning from a Low Power state Upon entering into Debug Mode Upon returning from Debug Mode Upon occurrence of counter overrun Upon a periodic counter expiration Upon occurrence of one or more User selectable events within system 10

Note that alternate embodiments may use more, fewer, or different time domain events than those listed above.

In one embodiment, a Master Timestamp Sync Message may be messaged via debug interface 90 (provided Timestamp Messaging is enabled) for the following time domain events:

Initial Master Timestamp Sync Message after exit from system reset or whenever Master Timestamp Messaging is enabled Upon a change in system 10 reference clock Upon a change in any (or selected ones of) Target Domain clocks Upon entering into a Low Power state Upon returning from a Low Power state Upon entering into Debug Mode Upon returning from Debug Mode Upon occurrence of a particular Target Domain counter overrun Upon a periodic counter expiration Upon an internally or externally generated system 10 event Upon occurrence of one or more User selectable events within system 10

Note that alternate embodiments may use more, fewer, or different time domain events than those listed above.

Although the illustrated form of system 10 will be described in the context of performing timestamping for debug purposes, alternate embodiments may perform timestamping for any desired purpose. Also, although the debug interface 90 is described as using standard debug interface circuitry and protocols, such as the JTAG interface 94 and the NEXUS interface 92, alternate embodiments may use any desired interface, standard or non-standard, for debug interface 90.

Figure 5:
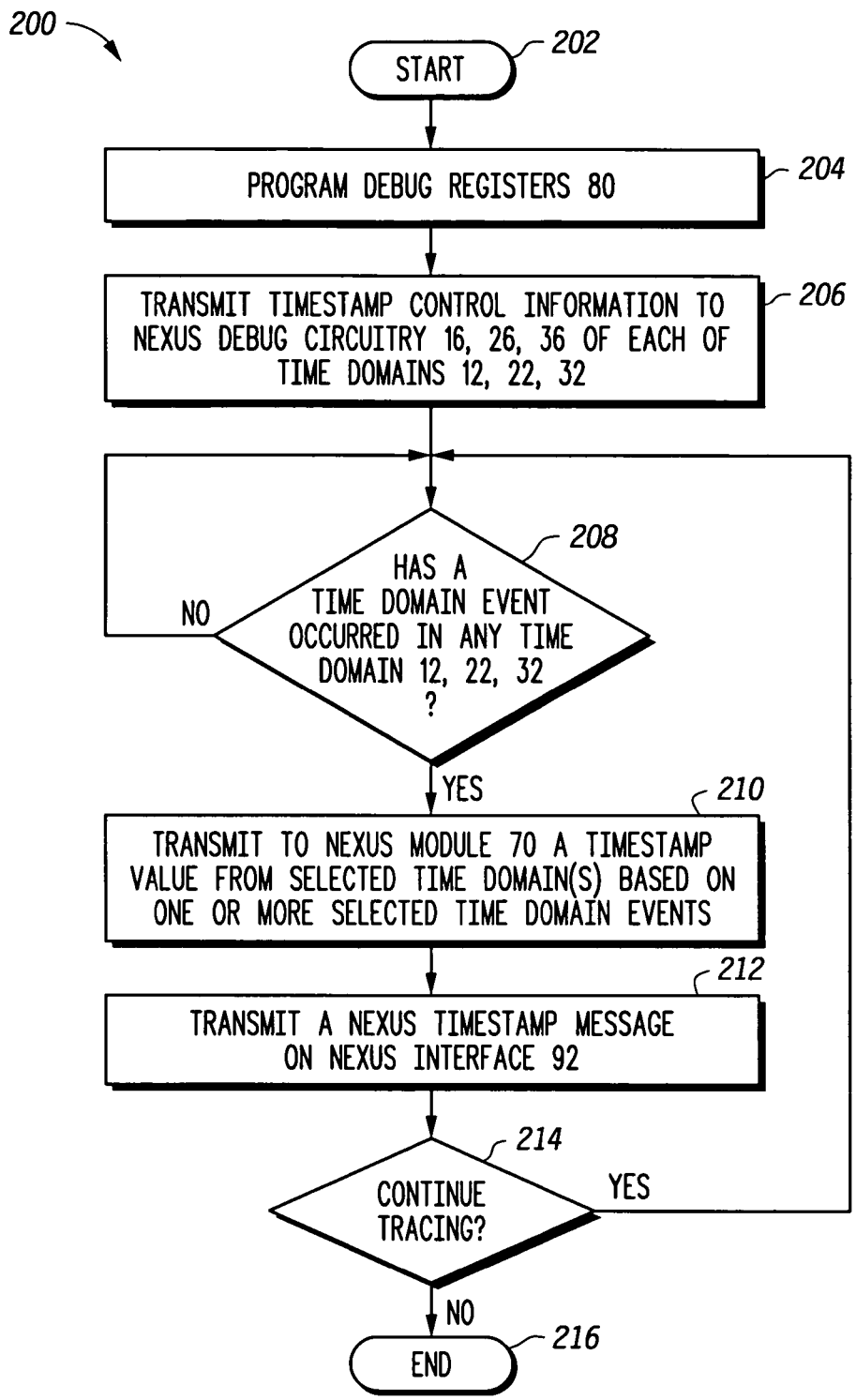
FIG. 5 illustrates, in flow diagram form, a method for time-ordering debug events in accordance with one embodiment of the present invention.

Referring now to FIG. 5, FIG. 5 illustrates a method for time-ordering debug events in accordance with one embodiment of system 10. The flow 200 starts at oval 202, and proceeds to step 204 where debug registers 80 (see FIG. 1) are programmed with timestamp control information. Note that alternate embodiments of system 10 may provide the timestamp control information directly to the time domains. For example, the timestamp control information may be received from debug interface 90, other interconnects going external to system 10 (not shown), system bus 96, or another source internal or external to system 10 (not illustrated). For some embodiments of system 10, registers 80 may be read and/or written by way of one or both of system bus 96 and debug interface 90. In alternate embodiments of system 10, registers 80 may be located anywhere within system 10.

The flow of FIG. 5 continues from step 204 to step 206 where the timestamp control information in transmitted to one or more of NEXUS debug circuitry 16, 26, and 36. Note that for one embodiment of system 10, timestamp control signals 60 are used to provide this timestamp control information to NEXUS debug circuitry 36. For one embodiment of system 10, the timestamp control information is provided to the counter control circuitry 42. In one embodiment of system 10, the timestamp control information may include control information for enabling reference counter 44, and any other control information that may be used to affect the information provided on timestamp signals 62.

The flow of FIG. 5 continues from step 206 to decision diamond 208 where the question is asked "has a time domain event occurred in any time domain 12, 22, 32?". If a time domain event has not occurred in any time domain 12, 22, 32, the flow stays at decision diamond 208 and continues to check whether a time domain event has occurred in any time domain 12, 22, 32. If a time domain event has occurred in any time domain 12, 22, 32, the flow continues to step 210 where a timestamp value, based on one or more selected time domain events, is transmitted to the NEXUS module 70 from one or more time domains.

Note that the time domain 12, 22, 32 which had the time domain event occur within it, may not necessarily be the time domain 12, 22, 32 which provides the timestamp value. For example, a time domain event which occurs in time domain 12 may trigger time domain 32 to provide a timestamp via timestamp signals 62 to NEXUS module 70. As an example, one possible use of this functionality may be to allow a power down time domain event in time domain 12 to cause time domain 32 to provide a timestamp via timestamp signals 62 so that it is possible to determine what functional circuitry 34 is doing when functional circuitry 14 is powered down. This functionality may be used for a wide variety of other purposes. One embodiment implements this functionality by way of the information shared between timestamp control circuits 72, 74, and 76. Alternate embodiments may provide other ways for functional circuitry 14, 24, and 34 to share information, such as, for example, by one or more signals coupled between two or more of functional modules 14, 24, and 34.

Figure 2:
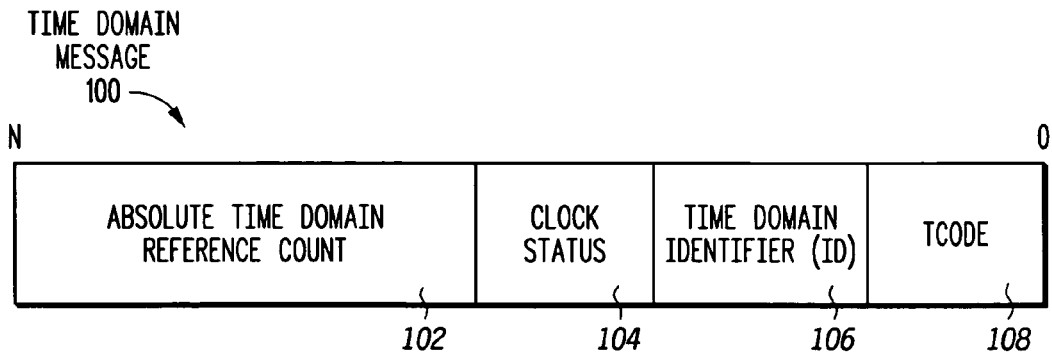
FIG. 2 illustrates, in block diagram form, a time domain message 100 in accordance with one embodiment of the present invention.
Figure 3:
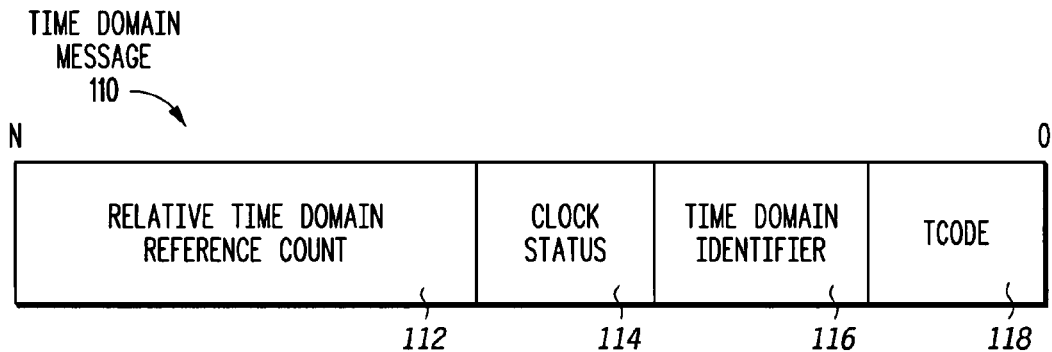
FIG. 3 illustrates, in block diagram form, a time domain message 110 in accordance with one embodiment of the present invention.
Figure 4:
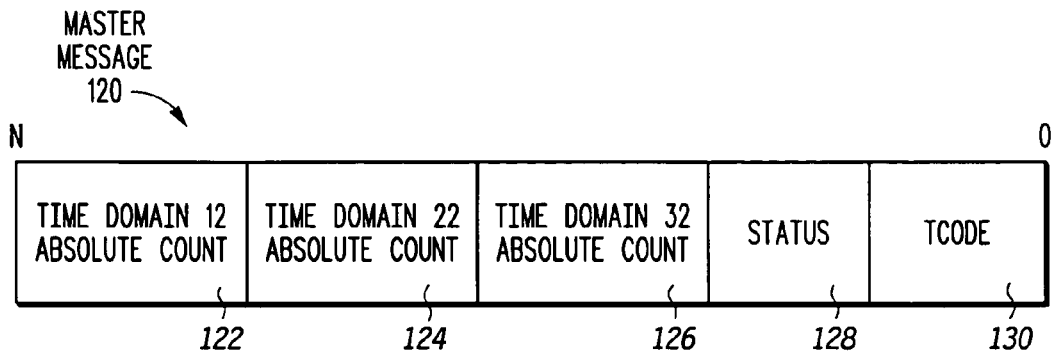
FIG. 4 illustrates, in block diagram form, a master message 120 in accordance with one embodiment of the present invention.

The flow of FIG. 5 continues from step 210 to step 212 where a NEXUS timestamp message is transmitted from NEXUS module 70 by way of NEXUS interface 90. In one embodiment, this NEXUS timestamp message uses the master message 120 format illustrated in FIG. 4. Alternate embodiments may use any message format. For example, one alternate embodiment may sequentially provide time domain messages (e.g. using one or more of the formats illustrated in FIG. 2 and FIG. 3) with a NEXUS TCODE indicating a start of the sequence and a NEXUS TCODE indicating an end of the sequence. Note that alternate embodiments of system 10 may use any desired format for providing timestamp information. The message formats illustrated in FIGS. 2-4 are for illustrative purposes only. Alternate message formats may be independent of NEXUS and may not use TCODES. Alternate message formats may or may not relate to debug functionality.

The flow of FIG. 5 continues from step 212 to decision diamond 214 where the question is asked "continue tracing?". If tracing is continued, the flow returns to decision diamond 208 and continues to check whether a time domain event has occurred in any time domain 12, 22, 32. If tracing is not continued, the flow continues to END oval 216 where the flow ends.

Referring now to FIGS. 2 and 3, FIG. 2 illustrates one embodiment of a time domain message 100 format which uses an absolute time domain reference value, while FIG. 3 illustrates one embodiment of a time domain message 110 format which uses a relative time domain reference value. For one embodiment, the formats for time domain messages 100 and 110 may be the same except for fields 102 and 112. In one embodiment, absolute time domain reference count bit field 102 may include the actual value of reference counter 44 (see FIG. 1) at approximately the time that the present domain event occurred. In one embodiment, relative time domain reference count bit field 112 may include the difference between: (1) the actual value of reference counter 44 at approximately the time that the present domain event occurred; and (2) the previous value of reference counter 44 at approximately the time that the previous domain event occurred. Note that for some embodiments, less bandwidth or fewer signals (e.g. in timestamp signals 62 of FIG. 1) may be required to transmit a relative time domain reference count as compared to an absolute time domain reference count.

Still referring to FIGS. 2 and 3, time domain messages 100, 110 include a clock status bit field 104, 114, respectively. In one embodiment, the clock status field 104, 114 may include information regarding whether clocks are enabled, what clock frequency is being used, or any other information regarding the status of clocks in the corresponding time domain 32. Time domain message formats 100, 110 also include a time domain identifier bit field 106, 116, respectively. In one embodiment, the time domain identifier 106, 116 may include information regarding which time domain 12, 22, 32 is providing the information in the time domain message. Time domain message formats 100, 110 also include a TCODE bit field 108, 118, respectively. In one embodiment, the TCODE bit field 108, 118 may include information regarding which NEXUS message type is the message type used by time domain message 100 and 110.

Referring to FIG. 4, master message 120 includes a time domain absolute count 122, 124, 126 for each time domain 12, 22, 32, which provided a timestamp in response to a domain event. Thus, master message 120 includes one or more time domain absolute count bit fields 122, 124, 126. Note that for one embodiment, if time domain 32 did not provide a timestamp to NEXUS module 70 (e.g. by way of timestamp signals 62), then bit field 126 will not include a useful count value, or will not be included in master message 120. Similarly, if time domain 12 did not provide a timestamp to NEXUS module 70, then bit field 122 will not include a useful count value, or will not be included in master message 120. Likewise, if time domain 22 did not provide a timestamp to NEXUS module 70, then bit field 124 will not include a useful count value, or will not be included in master message 120. Note that if one or more time domains 12, 22, 32 provide a relative time domain reference count (e.g. 112) rather than an absolute time domain reference count to NEXUS module 70, if desired, one or more relative time domain reference count values (e.g. 112) can be converted to a corresponding absolute time domain reference count (e.g. 102), for example, by way of timestamp control circuitry 72, 74, 76 (see FIG. 1). In an alternate embodiment, all time domains 12, 22, 32 which are providing a timestamp for the master message 120 may use the absolute time domain reference count (e.g. 102), instead of the relative time domain reference count (e.g. 112).

Still referring to FIG. 4, master message 120 includes a status bit field 128. In one embodiment of system 10, the status field 128 may include, in an encoded or non-encoded form, all or a portion of the information from one or more clock status fields 104, 114. In one embodiment of system 10, one or more of the time domains 12, 22, 32 that provide a count value to one of time domain absolute count fields 122, 124, 126 may also provide any desired status information to status bit field 128. In one embodiment of system 10, the status bit field 128 may include more status information than that included in clock status bit fields 104, 114. This status information may relate to any desired status of circuitry within one or more time domains 12, 22, and 32.

Master message 120 also includes a TCODE bit field 130. In one embodiment, the TCODE bit field 130 may include information regarding which NEXUS message type is the message type used by master message 120.

Referring to FIG. 1, in the illustrated embodiment, one embodiment of NEXUS debug circuitry 36 and debug bus 38 is described in detail for time domain 32. Time domain 12 also has NEXUS debug circuitry 16 and debug bus 18 which may be implemented in a different manner or in the same manner as in time domain 32. Likewise, time domain 22 also has NEXUS debug circuitry 26 and debug bus 28 which may be implemented in a different manner or in the same manner as in time domain 32.

The operation of the illustrated embodiment for time domain 32 will now be described. In one embodiment of system 10, timestamp control circuitry 74 provides timestamp control information to counter control circuitry 42 by way of timestamp control signals 60. Counter control circuitry 42 then uses this control information to control reference counter 44. In one embodiment of system 10, other circuitry 52 provides all domain events to timestamp control 74 by way of domain event information signals 64. In alternate embodiments, timestamp control signals 60 may provide information to other circuitry 52 regarding which domain events have been selected and thus should be provided to timestamp control 74 by way of domain event information 64.

Once timestamp control 74 has determined that a selected domain event has occurred, timestamp control 74 provides control information to counter control circuitry 42 by way of timestamp control signals 60 to indicate that the value in reference counter 44 should be captured and provided to timestamp control 74 by way of timestamp signals 62. Note that a domain event in time domain 12 or 22 may also be used by timestamp control 74 to trigger a capture of the value in reference counter 44. This is possible because timestamp control 72, 74, and 76 may share information. Alternate embodiments may want to shorten the delay between the occurrence of the domain event and the capturing of the value in the reference counter. One embodiment of system 10 may accomplish this by moving some of the functionality of the timestamp control circuitry 74 into the NEXUS debug circuitry 36 so that the detecting of the domain event directly triggers the capture of the value of the reference counter 44, without any involvement of circuitry (e.g. timestamp control 74) outside of the NEXUS debug circuitry 36.

Note that the value of reference counter 44 may be provided by the timestamp signals 62 and may be considered to provide the absolute time domain reference count 102 in time domain message 100 (see FIG. 2). The value of reference counter 44 must be appropriately modified by counter control circuitry 42 to provide a relative time domain reference count by way of timestamp signals 62 if the relative time domain reference count format of time domain message 110 is used (see FIG. 3). The format of the timestamp information provided from timestamp circuitry 40 to timestamp signals 62 may be determined in any manner. For example, registers 80 may determine this format. Alternate embodiments may use a fixed format, or may alternately select the format in any desired manner.

For alternate embodiments, all or some of the functionality performed by timestamp control 74 may be centralized as illustrated in FIG. 1, or may alternately be distributed within the time domains 12, 22, 32 themselves. In the embodiment of system 10 illustrated in FIG. 1, the time domain identifier circuitry 48 is used to provide the time domain identifier (see bit field 106 in FIG. 2 and bit field 116 in FIG. 3) by way of other signals 66. Similarly, TCODE generator 50 is used to provide the TCODES (see bit field 108 in FIG. 2, bit field 118 in FIG. 3, and bit field 130 in FIG. 4) by way of other signals 66. Similarly, clock status 46 is used to provide the clock status information (see bit field 104 in FIG. 2, bit field 114 in FIG. 3, and bit field 128 in FIG. 4) by way of other signals 66.

In one embodiment of system 10, arbiter 78 may be used to arbitrate and determine which timestamp control circuit 72, 74, or 76 is allowed to provide information to debug interface 90 for transmission external to system 10.

In one embodiment of system 10, the clock status field 104, 114 may include information regarding whether clocks are enabled, what clock frequency is being used, or any other information regarding the status of clocks in the corresponding time domain 32. Time domain message formats 100, 110 also include a time domain identifier bit field 106, 116, respectively. In one embodiment, the time domain identifier 106, 116 may include information regarding which time domain 12, 22, 32 is providing the information in the time domain message. Time domain message formats 100, 110 also include a TCODE bit field 108, 118, respectively. In one embodiment, the TCODE bit field 108, 118 may include information regarding which NEXUS message type is the message type used by time domain message 100 and 110.

Although the embodiments have been described with respect to specific conductivity types or polarity of potentials, skilled artisans appreciated that various modifications may be implemented. For example, any type of functional circuitry may be used with the NEXUS debug circuitry. Various semiconductor processes may be implemented and conductivity types and polarities of potentials may be reversed. The system 10 may be implemented either on a single integrated circuit as a system on a chip (SOC) or may be implemented with discrete components on a printed circuit board level. The physical positioning of the various fields of the timestamping messages may be arranged in differing orders than that illustrated. Various arbitration schemes may be used to implement arbiter 78. Any type of storage device may be used to implement the registers 80. The counters described herein may be implemented with various types of known hardware counter circuits and is not limited to any one particular type of counter. The bus sizes may be implemented with any of various possible bit widths. The above description of various modifications is intended for illustrative purposes only. A wide variety of other modifications are also possible.

In one form there has been provided a method in a system for time ordering events in the system. Control information corresponding to each of a plurality of time domains is provided. The control information indicates when a timestamp message for each of the plurality of time domains is to be generated. A determination is made when a time domain event that requires generation of a timestamp message occurs in any one of the plurality of time domains. A timestamp message is generated corresponding to a predetermined one of the plurality of time domains in response to determining that the time domain event occurred. In one form, a same port is used for all of the plurality of time domains to output timestamp messages. In one form, in response to the control information, included within the timestamp message is a time count in a message generating time domain that is an absolute count value of when the time domain event occurred in the message generating time domain. In another form, in response to the control information, included within the timestamp message is a time count in a message generating time domain that is a relative count value measured from a most recently occurring previous time domain event of when the time domain occurred in the message generating time domain. In another form, in response to the control information, included within the timestamp message is a time count for all of the plurality of time domains corresponding to when the time domain event occurred. In yet another form, included within the timestamp message is a format identifier field that identifies one of a plurality of predetermined formats that the timestamp message has. The control information is used to specify when a time domain event that requires generation of a timestamp message occurs in a predetermined one of the plurality of time domains. A subsequent determination is made that the time domain event has occurred in the predetermined one of the plurality of time domains. In one form, the control information is programmed into a storage device. In another form the timestamp message is generated in response to the control information identifying predetermined operating conditions that create the time domain event in at least one of the plurality of time domains. In yet another form the predetermined operating conditions are identified to be at least one of a user programmable event and a programmable system event. In another form the at least one programmable system event includes at least one of entrance into or exit from a power mode of operation, a change in source of a clock, a change in clock periodicity, a predetermined change in a hardware counter value or entry into and exit from a debug mode of operation. The system, in one form, is made up of a plurality of functional circuit modules, each functional circuit module being clocked by a clock that represents a different time domain and having timestamping circuitry. The timestamping circuitry provides a message that indicates a point in time when a predetermined event occurs. An interface module is coupled to each of the plurality of functional circuit modules, the interface module providing control information to the plurality of functional circuit modules to indicate at least one operating condition that triggers the predetermined event. The interface module receives at least one timestamping message from a first time domain when the predetermined event occurs in one of a plurality of time domains including the first time domain. The interface module further includes storage circuitry for storing the control information as programmable control information that determines the at least one operating condition that triggers the predetermined event. In one form the at least one operating condition that triggers the predetermined event further includes at least one of: entrance into or exit from a power mode of operation, a change in source of a clock, a change in clock periodicity, a predetermined change in a hardware counter value, entry into and exit from a debug mode of operation, and occurrence of at least one user programmable event. In another form the timestamping circuitry further includes a counter for determining either absolute or relative time in a corresponding functional circuit module, time domain identification circuitry for providing a time domain identifier, and clock status circuitry for providing one or more operating characteristics of a clock in the corresponding functional circuit module. In another form the timestamping circuitry further includes circuitry for generating a code to be included in each message to identify a format of information included in a corresponding message. The interface module further includes an arbiter having circuitry for generating a code to be included in each timestamping message to identify a format of information included in a corresponding timestamping message. In one implementation the common interface port of the interface module meets IEEE ISTO 5001 (NEXUS) compliance. In one form the message provided by at least one of the plurality of functional circuit modules has a format that includes at least a time count value that is an absolute value referenced to a known starting value, status information of a clock signal associated with one of the functional circuit modules, and an identifier that indicates a corresponding time domain associated with the timestamping message. In another form the message has a format that further includes a field that identifies that the format of the timestamping message has an absolute value time count value. In yet another form the message provided by at least one of the plurality of functional circuit modules has a format that includes at least a time count value that is a relative value referenced to a last occurring predetermined event, status information of a clock signal associated with one of the functional circuit modules, and an identifier that indicates a corresponding time domain associated with the timestamping message. In a further form, the message has a format that further includes a field that identifies that the format of the timestamping message having a relative value time count value. In another form the timestamping message has a format that includes a time count value corresponding to each of the functional circuit modules and predetermined status information associated with each of the functional circuit modules when the predetermined event occurs. As illustrated, the control information is programmable and the interface module has at least one register for storing the control information.

In another form there is provided a system having a plurality of functional circuit modules on a same integrated circuit. Each functional circuit module is clocked by a clock that represents a different time domain. Each functional module has timestamping circuitry operating at independent clock rates for providing timestamp messages. The timestamp messages each indicate a point in time when a predetermined event occurs. An interface module is coupled to each of the plurality of functional circuit modules, the interface module providing control information to the plurality of functional circuit modules to indicate at least one operating condition that triggers the predetermined event. The interface module receives at least one timestamping message from a first time domain when the predetermined event occurs in one of a plurality of time domains including the first time domain. In another form there is provided a method of reconstructing time ordering of events that occur in multiple time domains in a system. Multiple timestamping messages are received in one of an ordered time sequence and an unordered time sequence. Relative count values of multiple time domain counters associated with the multiple time domains and operating at independent clock rates are tracked. Debug information is sorted in time ordered sequence, the debug information being associated with a timestamp provided from one of the multiple time domains. The debug information is provided via a debug message. The debug messages are implemented as at least one of a program trace message, a data trace message and a watchpoint message. The multiple timestamp messages are generated by providing control information corresponding to each of multiple time domains, the control information indicating when a timestamp message for each of the multiple time domains is to be generated. A determination is made as to when a time domain event that requires generation of a timestamp message occurs in any one of the multiple time domains. A timestamp message is generated corresponding to a predetermined one of the multiple time domains in response to determining that the time domain event occurred.

Note that elements illustrated herein may have intervening elements not illustrated that couple the illustrated elements. The term coupled, as used herein, is defined as joined or linked, although not necessarily directly, and not necessarily mechanically.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system for time ordering events comprising:
   a plurality of functional circuit modules, each functional circuit module being clocked by a clock that represents a different time domain, such that the plurality of functional circuit modules operate independently of each other with respect to time and each of the plurality of functional circuit modules having timestamping circuitry, the timestamping circuitry providing a timestamping message that indicates a point in time when a predetermined event occurs in a corresponding time domain out of a plurality of time domains; and
   an interface module coupled to each of the plurality of functional circuit modules, the interface module providing control information to the plurality of functional circuit modules to indicate at least one operating condition that triggers the predetermined event, the interface module receiving at least the timestamping message when the predetermined event occurs.

2. The system of claim 1 wherein the interface module further comprises:
   storage circuitry for storing the control information as programmable control information that determines the at least one operating condition that triggers the predetermined event.

3. The system of claim 2 wherein the at least one operating condition that triggers the predetermined event further comprises at least one of: entrance into or exit from a power mode of operation, a change in source of a clock, a change in clock periodicity, a predetermined change in a hardware counter value, entry into and exit from a debug mode of operation, and occurrence of at least one user programmable event.

4. The system of claim 1 wherein the timestamping circuitry further comprises:
   a counter for determining either absolute or relative time in a corresponding functional circuit module;
   time domain identification circuitry for providing a time domain identifier; and
   clock status circuitry for providing one or more operating characteristics of a clock in the corresponding functional circuit module.

5. The system of claim 4 wherein the timestamping circuitry further comprises circuitry for generating a code to be included in each message to identify a format of information included in a corresponding message.

6. The system of claim 4 wherein the interface module further comprises an arbiter having circuitry for generating a code to be included in each timestamping message to identify a format of information included in a corresponding timestamping message.

7. The system of claim 1 wherein the timestamping message provided by at least one of the plurality of functional circuit modules has a format that comprises at least a time count value that is an absolute value referenced to a known starting value, status information of a clock signal associated with one of the functional circuit modules, and an identifier that indicates a corresponding time domain associated with the timestamping message.

8. The system of claim 7 wherein the timestamping message has a format that further comprises a field that identifies that the format of the timestamping message has an absolute value time count value.

9. The system of claim 1 wherein the timestamping message provided by at least one of the plurality of functional circuit modules has a format that comprises at least a time count value that is a relative value referenced to a last occurring predetermined event, status information of a clock signal associated with one of the functional circuit modules, and an identifier that indicates a corresponding time domain associated with the timestamping message.

10. The system of claim 9 wherein the timestamping message has a format that further comprises a field that identifies that the format of the timestamping message having a relative value time count value.

11. The system of claim 1 wherein the timestamping message has a format that comprises a time count value corresponding to each of the functional circuit modules and predetermined status information associated with each of the functional circuit modules when the predetermined event occurs.

12. The system of claim 1 wherein the control information is programmable.

13. The system of claim 1 wherein the interface module further comprises:
at least one register for storing the control information.

14. The system of claim 1 wherein the interface module provides timestamping messages from all time domains at a common interface port.

15. The system of claim 14 wherein the common interface port of the interface module meets IEEE ISTO 5001 (NEXUS) compliance.

16. A system for time ordering events comprising:
a plurality of functional circuit module means, each being clocked by a clock that represents a different time domain, such that the plurality of functional circuit modules operate independently of each other with respect to time and each of the plurality of functional circuit modules having timestamping circuit means, the timestamping circuit means providing a timestamping message that indicates a point in time when a predetermined event occurs in a corresponding time domain out of a plurality of time domains; and
interface module means coupled to each of the plurality of functional circuit module means, the interface module means providing control information to the plurality of functional circuit module means to indicate at least one operating condition that triggers the predetermined event, the interface module means receiving at least the timestamping message when the predetermined event occurs.

17. The system of claim 16 wherein the timestamping messages from all time domains are provided by interface module means at a common interface port means.

18. A system for time ordering events comprising:
a plurality of functional circuit modules, each functional circuit module being clocked by a clock that represents a different time domain, such that the plurality of functional circuit modules operate independently of each other with respect to time and each of the plurality of functional circuit modules having timestamping circuitry, the timestamping circuitry providing a timestamping message that indicates a point in time when a predetermined event occurs in a corresponding time domain out of a plurality of time domains, wherein the timestamping circuitry comprises:
a counter for determining either absolute or relative time in a corresponding functional circuit module,
time domain identification circuitry for providing a time domain identifier, and
clock status circuitry for providing one or more operating characteristics of a clock in the corresponding functional circuit module; and
an interface module coupled to each of the plurality of functional circuit modules, the interface module providing control information to the plurality of functional circuit modules to indicate at least one operating condition that triggers the predetermined event, the interface module receiving at least the timestamping message when the predetermined event occurs.

19. The system of claim 18, wherein the interface module further comprises:
storage circuitry for storing the control information as programmable control information that determines the at least one operating condition that triggers the predetermined event.

20. The system of claim 18, wherein the at least one operating condition that triggers the predetermined event further comprises at least one of: entrance into or exit from a power mode of operation, a change in source of a clock, a change in clock periodicity, a predetermined change in a hardware counter value, entry into and exit from a debug mode of operation, and occurrence of at least one user programmable event.

21. A system for time ordering events comprising:
a plurality of functional circuit modules, each functional circuit module being clocked by a clock that represents a different time domain, such that the plurality of functional circuit modules operate independently of each other with respect to time and each of the plurality of functional circuit modules having timestamping circuitry, the timestamping circuitry providing a timestamping message that indicates a point in time when a predetermined event occurs in a corresponding time domain out of a plurality of time domains, wherein the timestamping circuitry comprises:
a counter for determining either absolute or relative time in a corresponding functional circuit module,
time domain identification circuitry for providing a time domain identifier,
clock status circuitry for providing one or more operating characteristics of a clock in the corresponding functional circuit module, and
circuitry for generating a code to be included in the timestamping message to identify a format of information included in the timestamping message; and
an interface module coupled to each of the plurality of functional circuit modules, the interface module providing control information to the plurality of functional circuit modules to indicate at least one operating condition that triggers the predetermined event, the interface module receiving at least the timestamping message when the predetermined event occurs.

* * * * *